United States Patent
Suzuki et al.

(10) Patent No.: US 9,944,197 B2
(45) Date of Patent: Apr. 17, 2018

(54) VEHICLE

(71) Applicant: SUBARU CORPORATION, Tokyo (JP)

(72) Inventors: Hiroyuki Suzuki, Tokyo (JP); Yukihiro Osaku, Tokyo (JP); Yukihito Inaba, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/644,900

(22) Filed: Jul. 10, 2017

(65) Prior Publication Data
US 2018/0043791 A1 Feb. 15, 2018

(30) Foreign Application Priority Data
Aug. 12, 2016 (JP) .................................. 2016-158935

(51) Int. Cl.
| G05B 11/28 | (2006.01) |
| B60L 15/08 | (2006.01) |
| B60L 15/20 | (2006.01) |
| H02P 27/08 | (2006.01) |

(52) U.S. Cl.
CPC ............ B60L 15/08 (2013.01); B60L 15/2054 (2013.01); H02P 27/08 (2013.01); *B60L 2210/40* (2013.01); *Y10S 903/906* (2013.01)

(58) Field of Classification Search
CPC ...... H02P 1/00; H02P 3/00; H02P 5/00; H02P 6/00; H02P 21/00; H02P 27/04; H02P 27/06; H02P 41/00; H02P 41/02; H02P 1/52; H02P 9/06; H02P 6/10; G05B 11/28; H02K 29/06

USPC .... 318/110, 400.01, 400.02, 400.23, 400.24, 318/700, 779, 799, 727, 432, 599, 800, 318/801, 811, 721; 180/24.06, 53.1, 65.1, 180/65.21, 337, 381; 375/227; 363/21.1, 363/40, 44, 95, 120, 174, 175
See application file for complete search history.

(56) References Cited

U.S. PATENT DOCUMENTS

2013/0026955 A1* 1/2013 Kikunaga ............. H02P 27/085
318/51

FOREIGN PATENT DOCUMENTS

JP 2012-254762 A 12/2012

* cited by examiner

*Primary Examiner* — Antony M Paul
(74) *Attorney, Agent, or Firm* — McDermott Will & Emery LLP

(57) ABSTRACT

A vehicle includes an inverter, a motor, a transmission, and a modulator. The inverter performs pulse width modulation processing at a predetermined carrier frequency. The motor is supplied with electric power from the inverter. The transmission changes the number of revolutions of the motor, and transmits rotary power of the motor to one or more driving wheels. The modulator controls the pulse width modulation processing performed by the inverter, and changes the carrier frequency of the pulse width modulation processing, to offset a change in a frequency of a sideband component out of frequencies of a carrier sound. The carrier sound is generated in the motor or the inverter, or both, accompanying a stepwise change in the number of revolutions of the motor on a condition that the stepwise change is made by the transmission.

2 Claims, 4 Drawing Sheets

VEHICLE

CROSS-REFERENCE TO RELATED APPLICATIONS

The present application claims priority from Japanese Patent Application No. 2016-158935 filed on Aug. 12, 2016, the entire contents of which are hereby incorporated by reference.

BACKGROUND

The technology relates to a vehicle including a motor and a transmission.

In a vehicle including a motor as a driving source, direct current power supplied from a battery is converted in an inverter to alternating current power. The alternating current power is supplied to the motor. The inverter performs, for example, pulse width modulation (PWM) processing at a predetermined carrier frequency, as described in Japanese Unexamined Patent Application Publication (JP-A) No. 2012-254762.

SUMMARY

During the PWM processing by the inverter, a noise, or a carrier sound, may occur because of switching operation of the inverter. The carrier sound may be generated at various frequencies including a frequency of a sideband component that tends to be sensed as an unpleasant sound. The frequency of the sideband component depends on the number of revolutions of the motor. A speed change of a vehicle involves a change in the number of revolutions of the motor, which is accompanied by a change in the frequency of the sideband component. Accordingly, there arises possibility that an occupant of the vehicle may have a sense of discomfort.

It is desirable to provide a vehicle that makes it possible to restrain a change in a carrier noise in a speed change.

An aspect of the technology provides a vehicle including an inverter, a motor, a transmission, and a modulator. The inverter performs pulse width modulation processing at a predetermined carrier frequency. The motor is supplied with electric power from the inverter. The transmission changes the number of revolutions of the motor, and transmits rotary power of the motor to one or more driving wheels. The modulator controls the pulse width modulation processing performed by the inverter, and changes the carrier frequency of the pulse width modulation processing, to offset a change in a frequency of a sideband component out of frequencies of a carrier sound. The carrier sound is generated in the motor or the inverter, or both, accompanying a stepwise change in the number of revolutions of the motor on a condition that the stepwise change is made by the transmission.

DETAILED DESCRIPTION

Figure 1:
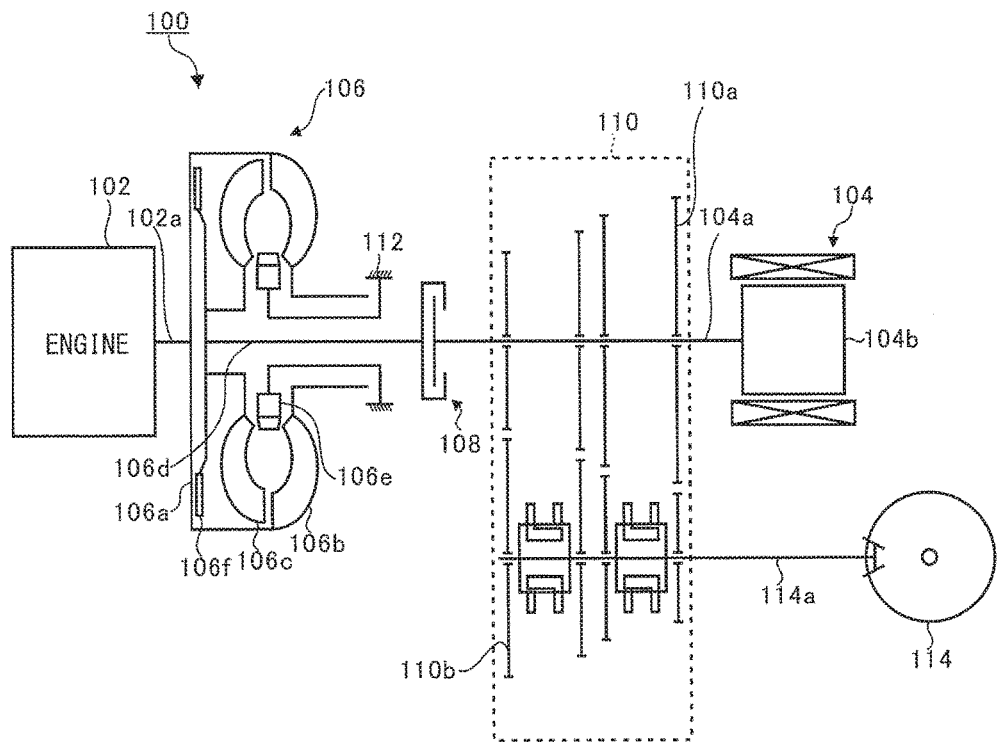
FIG. 1 is a block diagram that illustrates a configuration of a drive system related to a vehicle according to one implementation of the technology.

In the following, some implementations of the technology are described in detail with reference to the accompanying drawings. Dimensions, materials, and other specific numerical values described in the following implementations are merely exemplified for purposes of an easier understanding of the technology, and are not intended to provide limitation on the contents of the technology unless otherwise specified. It is to be noted that in the specification and the drawings, components having substantially same functions and configurations are denoted by same reference characters, so as to avoid redundant description. Depiction is omitted with regard to components that are not directly related to the technology.

FIG. 1 is a block diagram that illustrates a configuration of a drive system related to a vehicle 100 according to one implementation of the technology. Referring to FIG. 1, the vehicle 100 may include, as driving sources, an engine 102 and a motor 104.

A crank shaft 102a may be disposed to penetrate through the engine 102. The engine 102 may cause reciprocating operation of a piston with utilization of pressure generated upon explosion in a combustion chamber, and thereby cause rotation of the crank shaft 102a.

The motor 104 may be, for example but not limited to, a three-phase brushless DC motor having a U phase, a V phase, and a W phase. A rotation axis 104a may be fixed to a rotor 104b. The motor 104 may be coupled to a battery 152 described later with reference to FIG. 2. The motor 104 may make a rotation drive with utilization of electric power supplied from the battery 152 through an inverter 154 described later with reference to FIG. 2. Moreover, the motor 104 may generate electric power with utilization of rotation of the rotation axis 104a, and charge the battery 152 with utilization of the electric power generated.

In the vehicle 100, a torque converter 106, a hydraulic clutch 108, and a transmission 110 may be provided between the crank shaft 102a of the engine 102 and the rotation axis 104a of the motor 104, in the order of closeness to the engine 102.

In the torque converter 106, a front cover 106a may be coupled to another end of the crank shaft 102a. A pump impeller 106b may be fixed to the front cover 106a. Inside the front cover 106a, a turbine runner 106c may be disposed in confronted relation with the pump impeller 106b. The turbine runner 106c may be coupled to a turbine shaft 106d. Moreover, in the torque converter 106, a stator 106e may be disposed on inner circumferential side between the pump impeller 106b and the turbine runner 106c. A working fluid may be sealed in the torque converter 106. It is to be noted that the stator 106e may be fixed to a housing 112 that accommodates, for example but not limited to, the torque converter 106, the hydraulic clutch 108, and the transmission 110.

The pump impeller 106b and the turbine runner 106c may be provided with a number of blades. Rotation of the pump impeller 106b may cause the working fluid to be fed to outer circumferential side between the pump impeller 106b and the turbine runner 106c. In the meanwhile, the feeding of the working fluid to the turbine runner 106c may cause rotation of the relevant turbine runner 106c. Thus, motive power may be transmitted to the turbine runner 106c from the crank shaft 102a.

The stator 106e may change a flow direction of the working fluid fed from the turbine runner 106c, while allowing the working fluid to flow back to the pump impeller 106b, to promote the rotation of the pump impeller 106b. This makes it possible for the torque converter 106 to amplify transmission torque.

Moreover, in the torque converter 106, a clutch plate 106f may be fixed to the turbine shaft 106d. The clutch plate 106f may be disposed in confronted relation with an inner surface of the front cover 106a. The clutch plate 106f may be pressed onto the front cover 106a in accordance with hydraulic pressure, causing the motive power to be transmitted to the turbine shaft 106d from the crank shaft 102a. Moreover, controlling the hydraulic pressure may allow the clutch plate 106f to slide into contact with the front cover 106a. This allows for adjustment of the motive power transmitted to the turbine shaft 106d from the crank shaft 102a.

The vehicle 100 may switch coupling states of the hydraulic clutch 108, and thereby travel with utilization of the engine 102 or the motor 104, or both. In one specific but non-limiting example, the vehicle 100 may be able to switch motor traveling, engine traveling, and hybrid traveling. In a case with the motor traveling of the vehicle 100, the vehicle 100 may make the hydraulic clutch 108 in a cut-off state, to travel solely with utilization of the motor 104. In a case with the engine traveling of the vehicle 100, the vehicle 100 may make the hydraulic clutch 108 in an engaged state, while making the motor 104 idle or while making the motor 104 function as a generator, to travel solely with utilization of the engine 102. In a case with the hybrid traveling of the vehicle 100, the vehicle 100 may make the hydraulic clutch 108 in the engaged state, while driving both the engine 102 and the motor 104, to travel with utilization of both the engine 102 and the motor 104.

The transmission 110 may be, for example but not limited to, a stepped transmission. The transmission 110 changes the number of revolutions of the motor 104, and transmits rotary power of the motor 104 to one or more driving wheels 114. The transmission 110 may include a plurality of first gears 110a and a plurality of second gears 110b, without limitation. The plurality of the first gears 110a may be provided around the rotation axis 104a. The plurality of the second gears 110b may be provided around an output axis 114a that is disposed in parallel with the rotation axis 104a. To the output axis 114a, the one or more driving wheels 114 may be coupled. Accordingly, motive power transmitted to the rotation axis 104a from the engine 102 and the motor 104 may be subjected to a speed change by the transmission 110, and transmitted to the one or more driving wheels 114.

Figure 2:
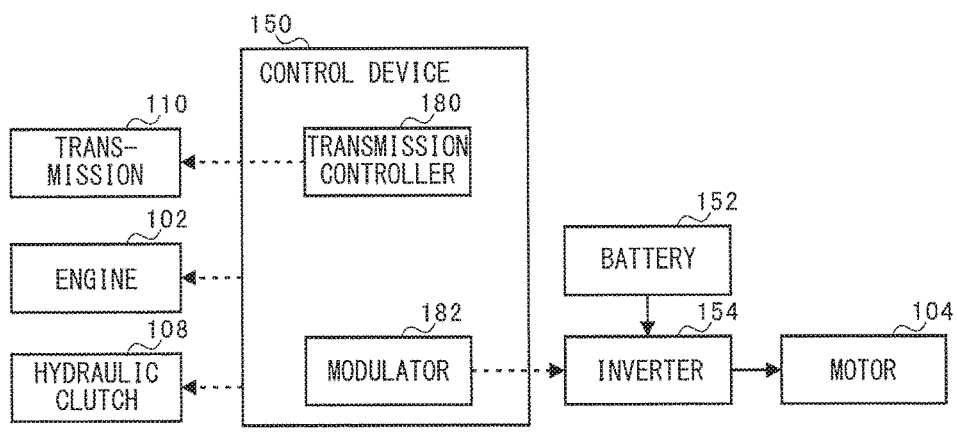
FIG. 2 is a block diagram that illustrates a configuration of a control system related to the vehicle illustrated in FIG. 1.

FIG. 2 is a block diagram that illustrates a configuration of a control system related to the vehicle 100 illustrated in FIG. 1. In FIG. 2, arrows in broken lines denote directions of control signals, and arrows in solid lines denote direction of the electric power. Referring to FIG. 2, the vehicle 100 may include a control device 150, i.e., an engine control unit, the battery 152, and an inverter 154, together with the motor 104 and the hydraulic clutch 108 as mentioned above.

The control device 150 may be, for example but not limited to, a microcomputer including a central processing unit (CPU), a read only memory (ROM), and a random access memory (RAM), without limitation, and perform a general control of each unit of the vehicle 100. The ROM may store, for example but not limited to, programs. The RAM may serve as a work area. In one specific but non-limiting implementation, the control device 150 may switch the cut-off state and the engaged state of the hydraulic clutch 108, on the basis of, for example but not limited to, an amount of stepping down of an accelerator pedal, an amount of stepping down of a brake pedal, a shift position of a gearshift lever, and a vehicle speed inputted from a vehicle speed sensor. The control device 150 may control, as appropriate, the engine 102, the motor 104, or the inverter 154, and the transmission 110.

Moreover, the control device 150 may function as a transmission controller 180 in controlling the transmission 110, and function as a modulator 182 in controlling the inverter 154. For example, the transmission controller 180 may allow the transmission 110 to make the speed change in response to an operation or a request of a driver, in accordance with, for example but not limited to, the vehicle speed, the number of revolutions of the engine 102, i.e., an engine revolution number, the number of revolutions of the motor 104, i.e., a motor revolution number, the amount of the stepping down of the accelerator pedal, the amount of the stepping down of the brake pedal, and an operation of a paddle shift. Thus, the transmission controller 180 may provide an optimal speed change ratio for a traveling state of the vehicle 100.

The inverter 154 may perform pulse width modulation (PWM) processing at a predetermined carrier frequency, on direct current power supplied from the battery 152, to convert the direct current power to alternating current power. The inverter 154 may supply the alternating current power to the motor 104. The modulator 182 controls the PWM processing performed by the inverter 154.

In the PWM processing, a noise, or a carrier sound, may occur because of, for example, switching operation in the inverter 154 or the motor 104, or both. The carrier sound may be generated at various frequencies including a frequency of a sideband component that tends to be sensed as an unpleasant sound. The frequency of the sideband component depends on the motor revolution number. Because the frequency of the sideband component changes with a change in the motor revolution number in the speed change, there is possibility that an occupant may have a sense of discomfort.

Figure 3:
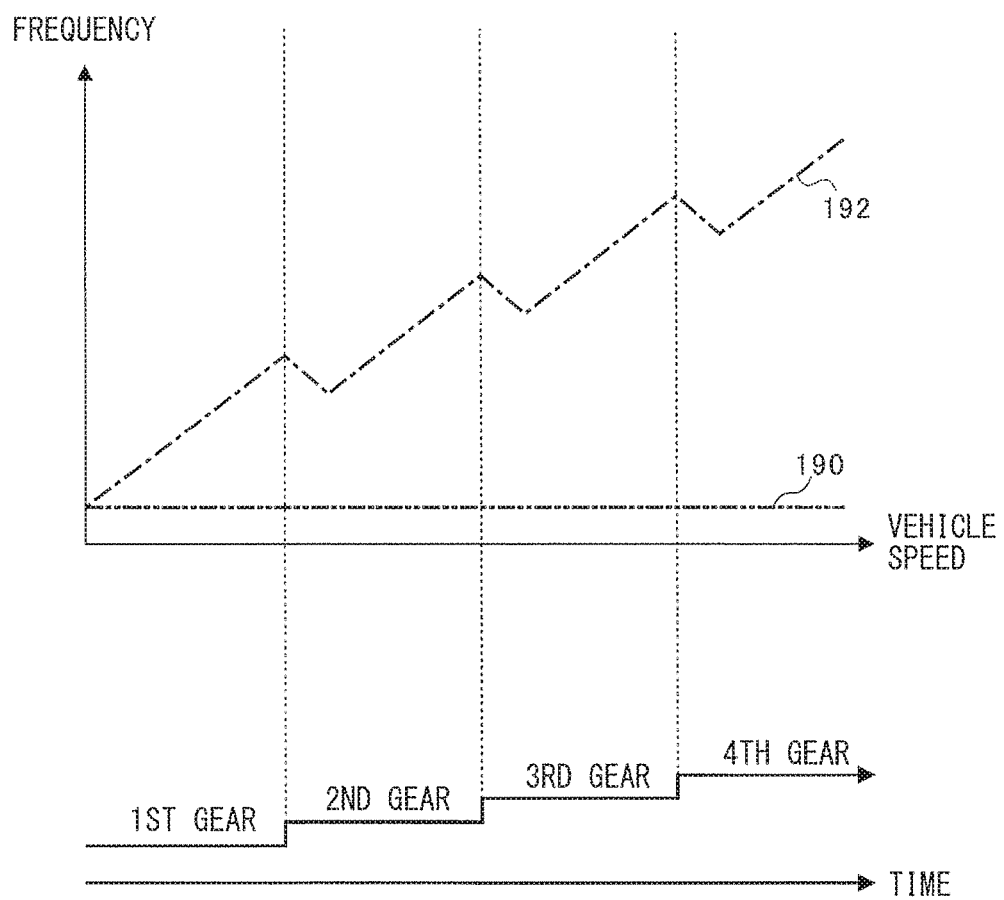
FIG. 3 is a diagram that illustrates a change in a frequency of a sideband component out of frequencies of a carrier sound, regarding a vehicle according to a comparative example.

FIG. 3 illustrates a change in the frequency of the sideband component of the carrier sound related to a vehicle according to a comparative example. In the vehicle according to the comparative example, the carrier frequency of the PWM processing performed by the inverter 154 may be constant, as denoted by a legend 190. In this case, when a transmission of the vehicle is sequentially upshifted from first gear to fourth gear, the frequency of the sideband component of the carrier sound may change as denoted by a legend 192 in FIG. 3.

The frequency of the sideband component may be derived by the following expression 1.

Frequency of sideband component (Hz)=Carrier frequency (Hz)+(Motor revolution number (rpm)/60)×(Motor degree)    (Expression 1)

In the expression 1, the motor degree denotes a degree of any component out of components included in a noise generated in the motor. In one implementation of the technology, for example, a degree of a component that makes the largest noise may be selected as the motor degree.

In FIG. 3, for example, when the transmission makes the speed change to the first gear, the motor revolution number may increase with passage of time. Accordingly, the vehicle speed and the frequency of the sideband component may each increase. However, for example, when the transmission makes the speed change to the second gear from the first gear, the motor revolution number may decrease temporarily, causing a temporary decrease in the frequency of the sideband component. Thereafter, the motor revolution number may turn upward, and the frequency of the sideband component may also turn upward.

As described, inclination of the change in the frequency of the sideband component before the speed change may be in reverse to that after the speed change. In FIG. 3, the frequency of the sideband component may increase before the speed change, and decrease after the speed change. Such a change in the frequency of the sideband component before and after the speed change may contribute to possibility that the occupant may have the sense of discomfort.

Therefore, in one implementation of the technology, the modulator 182 changes the carrier frequency, to restrain the change in the frequency of the sideband component in the speed change.

Figure 4:
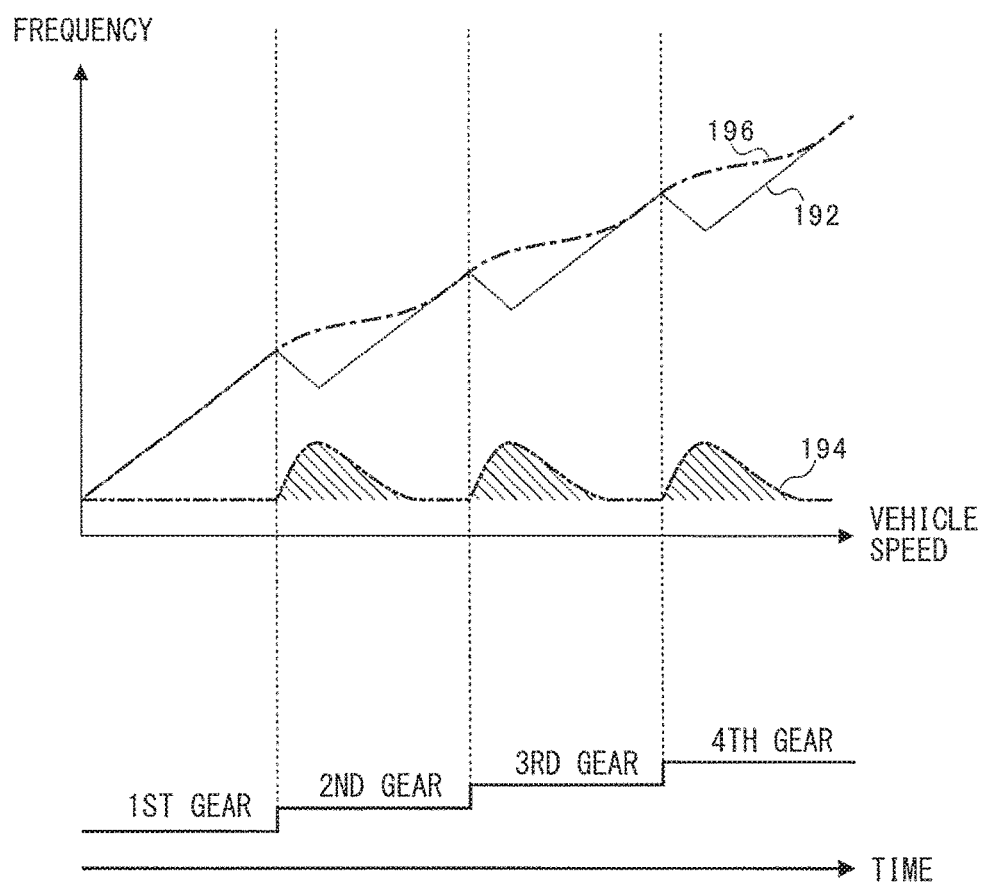
FIG. 4 is a diagram that illustrates a change in a frequency of a sideband component out of frequencies of a carrier sound, regarding a vehicle according to one implementation of the technology.

FIG. 4 illustrates the change in the frequency of the sideband component out of the frequencies of the carrier sound, regarding the vehicle 100 according to one implementation of the technology. FIG. 4 also includes the legend 192, i.e., the frequency of the sideband component, according to the comparative example illustrated in FIG. 3.

Referring to FIG. 4, in one implementation of the technology, when a stepwise speed change is made by the stepped transmission 110, the modulator 182 changes the carrier frequency of the PWM processing, to offset the change in the frequency of the sideband component out of the frequencies of the carrier sound accompanying the stepwise speed change. In other words, the modulator 182 may change the carrier frequency of the PWM processing in a direction in which the change in the frequency of the sideband component accompanying the stepwise speed change is offset. The carrier frequency of the PWM processing is denoted by a legend 194.

For example, when the transmission 110 makes the speed change to the second gear from the first gear, the frequency of the sideband component denoted by the legend 192 according to the comparative example may stop increasing, and turn downward. To offset such a change in the frequency of the sideband component, the modulator 182 may increase the carrier frequency as denoted by the legend 194, upon the speed change to the second gear from the first gear.

As represented in the expression 1, the frequency of the sideband component may be given by addition of the carrier frequency to the frequency that depends on the motor revolution number. Accordingly, increasing the carrier frequency may result in an increase in the frequency of the sideband component.

In FIG. 4, addition of an amount of the increase in the carrier frequency to the frequency of the sideband component denoted by the legend 192 may give the frequency of the sideband component denoted by a legend 196. The amount of the increase in the carrier frequency is denoted by a hatched area in FIG. 4. In the frequency of the sideband component denoted by the legend 196 according to one implementation of the technology, the change before and after the speed change is restrained, as compared to the frequency of the sideband component denoted by the legend 192 according to the comparative example.

As described, in one implementation of the technology, when the transmission 110 upshifts to the second gear from the first gear, the modulator 182 may increase the carrier frequency, to offset the decrease in the frequency of the sideband component accompanying the decrease in the motor revolution number. This causes a smooth increase in the frequency of the sideband component, making it possible to restrain the sense of discomfort given to the occupant due to the carrier noise, before and after the speed change.

Moreover, after an amount of the change in the carrier frequency denoted by the legend 194 reaches a maximum, the modulator 182 may gradually restore a value of the carrier frequency to a value before the change, i.e., a reference value of the carrier frequency. As a result, the frequency of the sideband component denoted by the legend 196 may approximate to the frequency of the sideband component denoted by the legend 192 according to the comparative example, and eventually converge on the frequency of the sideband component denoted by the legend 192.

In other words, the modulator 182 may allow the frequency of the sideband component denoted by the legend 196 to converge on a target value, with the frequency of the sideband component denoted by the legend 192 according to the comparative example serving as the target value. The target value denoted by the legend 192 may be derived as follows. After the speed change, the motor revolution number after recovery from the temporary decrease may be specified or estimated in advance, on the basis of, for example but not limited to, the amount of the stepping down of the accelerator pedal and the vehicle speed. The motor revolution number thus specified or estimated may be inputted to the expression 1 as mentioned above, to derive the target value.

At this occasion, the modulator 182 may perform, for example, smoothing processing such as a control of primary delay, on the carrier frequency, to cause a smooth change of the frequency of the sideband component denoted by the legend 196. This allows for further reduction in the sense of discomfort due to the carrier noise.

Furthermore, the modulator 182 may restore the carrier frequency to the reference value at a predetermined rate, in a case in which the amount of the stepping down of the accelerator pedal becomes zero, or in a case with a lapse of a preset setting time or longer, while the modulator 182 changes the carrier frequency from the reference value.

Figure 5:
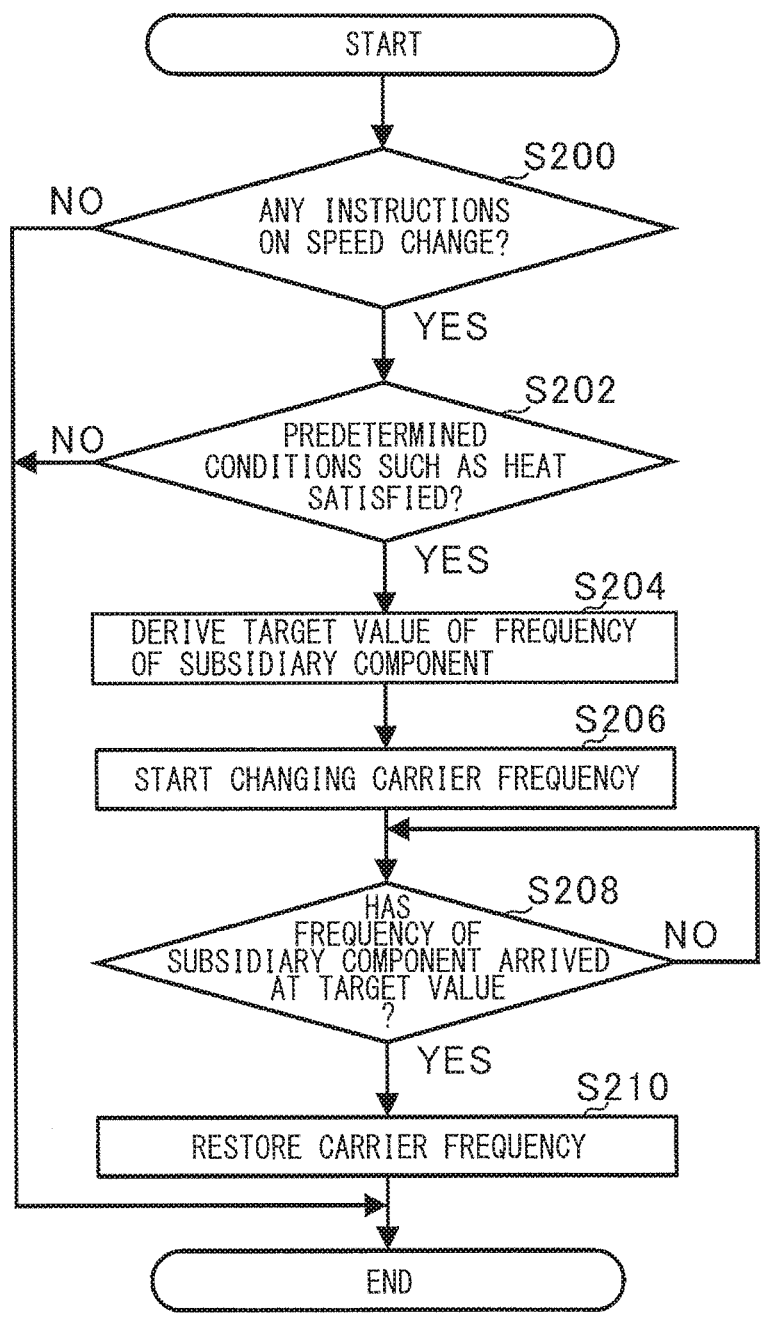
FIG. 5 is a flow chart that illustrates a procedure of control processing of an inverter related to the vehicle illustrated in FIG. 1.

FIG. 5 is a flowchart that illustrates a procedure of control processing of the inverter 154 regarding the vehicle 100. In the following, description is given, with reference to the flowchart, on the procedure of the control processing of the inverter 154 carried out by the modulator 182 as described above.

[Step S200]

The modulator 182 may determine presence or absence of a control instruction to allow the transmission 110 to make the speed change. In a case with the presence of the control instruction to allow the transmission 110 to make the speed change (YES in step S200), the flow may move on to step S202. In a case with the absence of the control instruction to allow the transmission 110 to make the speed change (NO in step S200), the control processing of the inverter 154 may be finished.

[Step S202]

The modulator 182 may determine whether or not predetermined conditions are satisfied. Non-limiting examples of the predetermined conditions may include absence of abnormal heating of the inverter 154, and absence of malfunctioning of the motor 104 and other devices. In a case in which the predetermined conditions are satisfied (YES in step S202), the flow may move on to step S204. In a case in which the predetermined conditions are not satisfied (NO in step S202), the control processing of the inverter 154 may be finished.

[Step S204]

The modulator 182 may input, to the expression 1, the motor revolution number after the recovery from the temporary change such as the increase or the decrease after the speed change. Thus, the modulator 182 may derive the target value of the frequency of the sideband component.

[Step S206]

The modulator 182 may start a control to change the carrier frequency, to allow the frequency of the sideband component to approximate to the target value, and thereafter, to converge on the target value.

[Step S208]

The modulator 182 may determine whether or not the frequency of the sideband component has arrived at the target value. In a case in which the frequency of the sideband component has not arrived at the target value (NO in step S208), the modulator 182 may repeat the processing of the determination on the arrival, until the frequency of the sideband component arrives at the target value. However, the flow may move on to step S210 in the case in which the amount of the stepping down of the accelerator pedal becomes zero, or in the case with the lapse of the preset setting time or longer. In a case in which the frequency of the sideband component has arrived at the target value (YES in step S208), the flow may move on to step S210.

[Step S210]

The modulator 182 may restore the carrier frequency to the reference value, and thereafter, finish the control processing of the inverter 154.

According to the control processing of the inverter 154 as described above, it is possible to restrain the change in the carrier sound in the speed change. Although some implementations of the technology have been described in the foregoing by way of example with reference to the accompanying drawings, the technology is by no means limited to the implementations described above. It should be appreciated that various modifications and alterations may be made without departing from the scope as defined by the appended claims, and the technology is intended to include such modifications and alterations.

For example, in the forgoing implementations, description is given on a case with the upshift in acceleration, but similar processing may be also carried out in a case with a downshift in deceleration. Specifically, when the transmission 110 makes the stepwise speed change of the number of revolutions of the motor 104, the modulator 182 may decrease the carrier frequency of the PWM processing, to offset the increase in the frequency of the sideband component of the carrier sound accompanying the speed change. However, in the deceleration, electric power of regenerative energy may be supplied to the inverter 154 from the motor 104, instead of electric power supply to the motor 104 from the inverter 154.

Moreover, in the forgoing implementations, description is made on the case in which the frequency of the sideband component may be given by the addition of the term of the frequency depending on the motor revolution number to the carrier frequency. However, the frequency of the sideband component may be given by subtraction of the term of the frequency depending on the motor revolution number from the carrier frequency. In other word, the frequency of the sideband component derived by the following expression 2 may be a target to be controlled.

Frequency of sideband component (Hz)=Carrier frequency (Hz)−(Motor revolution number (rpm)/60)×(Motor degree)  (Expression 2)

That is, either the value based on the expression 1 or the value based on the expression 2 may be selected as the frequency of the sideband component as a target to be controlled. For example, whichever causes the sense of discomfort more easily may be selected, the value based on the expression 1 or the value based on the expression 2. Moreover, regarding the remaining one of the value based on the expression 1 and the value based on the expression 2, countermeasures may be taken to physically soundproof the inverter 154 using, for example but not limited to, a cover member.

Furthermore, in the forgoing implementations, description is given on the case in which the transmission 110 is the stepped transmission. However, the transmission may be a continuously variable transmission. In the case in which the transmission 110 is the continuously variable transmission, the control regarding the frequency of the sideband component as described may be made, in a case in which stepwise speed change is made for purposes of, for example but not limited to, producing in an occupant a physical sensation of the speed change.

In one implementation described above, the control device 150 including the transmission controller 180 and the modulator 182 illustrated in FIG. 2 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 150 including the transmission controller 180 and the modulator 182. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 2.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle, comprising:
an inverter configured to perform pulse width modulation processing at a predetermined carrier frequency;

a motor configured to be supplied with electric power from the inverter;

a transmission configured to change a number of revolutions of the motor, and transmits rotary power of the motor to one or more driving wheels; and a modulator configured to control the pulse width modulation processing performed by the inverter, and changes the carrier frequency of the pulse width modulation processing, to offset a change in a frequency of a sideband component out of frequencies of a carrier sound, the carrier sound being generated in the motor or the inverter, or both, accompanying a stepwise change in the number of revolutions of the motor on a condition that the stepwise change is made by the transmission.

2. The vehicle according to claim 1, wherein the modulator performs smoothing processing on the carrier frequency.

* * * * *